(12) United States Patent
Koulagi

(10) Patent No.: US 8,559,604 B2
(45) Date of Patent: Oct. 15, 2013

(54) VOICEMAIL NOTIFICATION

(75) Inventor: Ravindra Koulagi, Bangalore (IN)

(73) Assignee: Cisco Technology, Inc, San Jose, CA (US)

( * ) Notice: Subject to any disclaimer, the term of this patent is extended or adjusted under 35 U.S.C. 154(b) by 1775 days.

(21) Appl. No.: 11/860,001

(22) Filed: Sep. 24, 2007

(65) Prior Publication Data

US 2009/0080622 A1    Mar. 26, 2009

(51) Int. Cl.
*H04M 1/64*      (2006.01)

(52) U.S. Cl.
USPC ............................. 379/88.12; 379/88.22

(58) Field of Classification Search
USPC ............................ 379/88.17–88.23
See application file for complete search history.

(56) References Cited

U.S. PATENT DOCUMENTS

| | | | | |
|---|---|---|---|---|
| 5,864,606 A | * | 1/1999 | Hanson et al. | 379/88.18 |
| 6,330,308 B1 | * | 12/2001 | Cheston et al. | 379/88.04 |
| 6,681,257 B1 | * | 1/2004 | Patel et al. | 709/245 |
| 6,711,242 B2 | * | 3/2004 | White et al. | 379/88.25 |
| 6,711,243 B1 | * | 3/2004 | Holt | 379/88.26 |
| 6,882,708 B1 | * | 4/2005 | Bedingfield et al. | 379/88.18 |
| 7,012,998 B1 | * | 3/2006 | Blackburn et al. | 379/88.18 |
| 7,209,551 B1 | * | 4/2007 | Schroeder et al. | 379/88.13 |
| 7,570,755 B2 | * | 8/2009 | Williams et al. | 379/266.1 |
| 7,945,029 B1 | * | 5/2011 | Wageman | 379/88.25 |
| 2005/0287993 A1 | * | 12/2005 | Gogic | 455/413 |

OTHER PUBLICATIONS

U.S. Appl. No. 11/686,494, filed Mar. 15, 2007, Srivastava et al.

Session Initiation Protocol, http://en.wikipedia.org/wiki/Session_Initiation_Protocol, Sep. 16, 2007, 4 pages.
Extension (telephone), http://en.wikipedia.org/wiki/Extension_(telephone), Apr. 19, 2007, 1 page.
Cisco CallManager, http://en.wikipedia.org/wiki/CallManager, Apr. 16, 2007, 2 pages.
Skinny Client Control Protocol, http://en.wikipedia.org/wiki/Skinny_Client_Control_Protocol, Apr. 6, 2007, 3 pages.

* cited by examiner

*Primary Examiner* — Joseph T Phan
(74) *Attorney, Agent, or Firm* — Haynes and Boone, LLP

(57) ABSTRACT

Certain embodiments of the present disclosure provide systems and methods for voicemail notification. In one embodiment, a method includes submitting an extension call request to a telephony system, wherein the extension call request identifies a recipient extension. The method also includes receiving a return message from the telephony system in response to the extension call request. The method further includes determining whether the recipient extension is currently associated with the telephony system based on the return message received from the telephony system. In addition, the method includes documenting an association between the recipient extension at the telephony system if the recipient extension is currently associated with the telephony system. The preceding operations may be repeated for additional recipient extensions and/or additional telephony systems to determine associations between one or more recipient extensions and one or more telephony systems. Various voicemail systems, telephony systems, and related methods are also provided.

20 Claims, 3 Drawing Sheets

VOICEMAIL NOTIFICATION

TECHNICAL FIELD

The present disclosure relates generally to voicemail systems.

BACKGROUND

VoIP (Voice over Internet Protocol) systems employ various methods and protocols to notify system users when a triggering event arises, such as the receipt of a voicemail message associated with a particular telephone extension. For example, IP (Internet Protocol) voicemail systems may send MWI (Message Waiting Indicator) notifications to their associated PBX (Private Branch eXchange) systems to identify such voicemail messages. Existing IP voicemail systems generally send MWI notifications to all of their associated PBX systems, regardless of whether an extension associated with the MWI notification actually resides on a PBX system.

DESCRIPTION

Overview

Figure 1A:
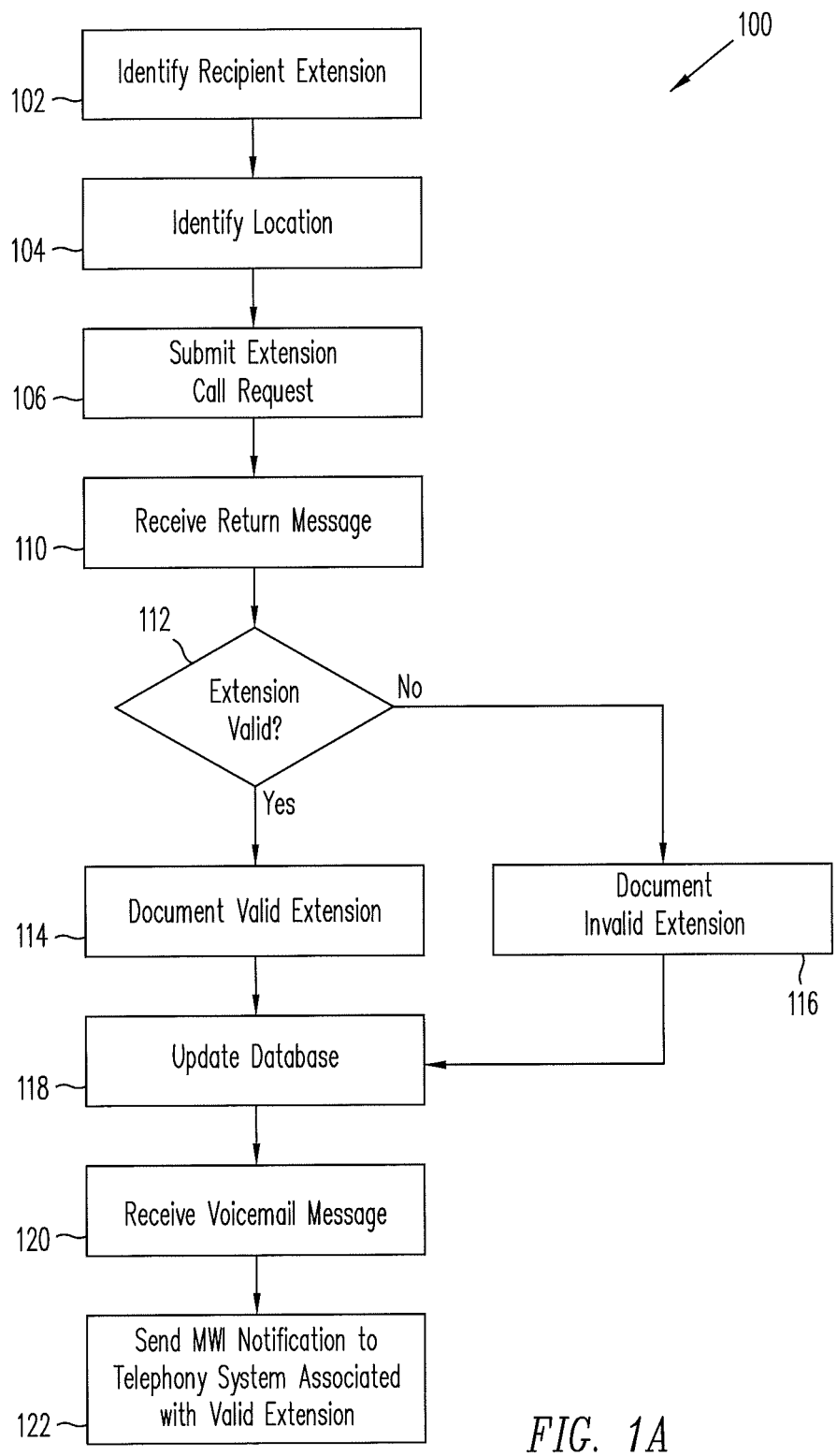
FIG. 1A shows an embodiment of a method performed by a voicemail system for discovering a location of a recipient extension.

The present disclosure relates generally to voicemail systems. Certain embodiments of the present disclosure provide systems and methods for voicemail notification. In one example, a voicemail system may adapted to submit an extension call request to a telephony system, wherein the extension call request identifies a recipient extension. The voicemail system may also receive a return message from the telephony system in response to the extension call request. The voicemail system may further determine whether the recipient extension is currently associated with the telephony system based on the return message received from the telephony system. In addition, the voicemail system may document an association between the recipient extension and the telephony system if the recipient extension is currently associated with the telephony system. The voicemail system may repeat such operations for a plurality of recipient extensions and/or a plurality of telephony systems. Certain embodiments of the present disclosure provide telephony systems responsive to such voicemail systems. In addition, certain embodiments of the present disclosure provide for logic and/or software encoded in one or more tangible media for execution and when executed operable to execute methods presented herein.

DESCRIPTION OF EXAMPLE EMBODIMENTS

Certain embodiments of the present disclosure provide systems and methods for discovering current locations of recipient extensions. A database or other appropriate data structure may store associations between recipient extensions and telephony systems, such as PBX systems, to identify locations of the recipient extensions. After the locations of recipient extensions are discovered, message waiting indicator (MWI) notifications may be sent to specific telephony systems to notify recipients of the existence of voicemail messages. This allows for MWI notifications to be provided to particular telephony systems without having to globally send MWI notifications to all telephony systems in communication with the voicemail system.

Certain embodiments of the present disclosure may be applied to various protocols including SCCP (Skinny Client Control Protocol) and SIP (Session Initiation Protocol). However, it should be appreciated by those skilled in the art that other embodiments may be implemented in accordance with any generally known protocols without departing from the scope of the present disclosure.

Certain embodiments of the present disclosure may be applied to VoIP voicemail systems, such as Cisco Unity, which may be used to provide centralized voicemail services to a plurality of local or remote telephony systems. Such voicemail systems, including Cisco Unity, may be implemented to send MWI notifications to such telephony systems.

In general, an extension may be understood to refer to a telephone line (e.g., a telephone extension) associated with a telephony system, such as a PBX system. In this regard, a user (e.g., a recipient) may be associated with the extension (e.g., a recipient extension). Accordingly, communications (e.g., telephone calls or MWI notifications) may be directed to individual recipients through their associated recipient extensions.

FIG. 1A shows an embodiment of a method 100 for discovering a location (e.g., a telephony system such as a PBX system) of a recipient extension. The method may be repeated for a plurality of locations until a resolution is achieved for the current location of a recipient extension. Method 100 will be discussed in reference to SCCP-based signaling and SIP-based signaling for use with an IP voicemail system, such as Cisco Unity, using various messages associated with such protocols as will be understood by those skilled in the art. However, method 100 may be implemented using various other protocols as may be desired.

Turning now to the particulars of method 100, in an operation 102, a voicemail system (e.g., voicemail system 210 of FIG. 2 further described herein) identifies a recipient extension to be contacted. In operation 104, the voicemail system identifies a location (e.g., one of a number of telephony systems associated with the voicemail system, such as PBX system 260 or 262 of FIG. 2 further described herein) with which the recipient extension may possibly be associated.

In an operation 106, the voicemail system attempts to contact the identified recipient extension at the identified telephony system by sending an extension call request to the telephony system identifying the recipient extension. For example, in one embodiment using SCCP-based signaling, operation 106 may include submitting to the telephony system an SCCP offhook message identifying the recipient extension. In another embodiment using SIP-based signaling, operation 106 may include submitting to the telephony system an SIP MWI notify message identifying the recipient extension.

In an operation 110, the voicemail system receives a return message from the telephony system. For example, the voicemail system may receive a first return message from the telephony system if the specified recipient extension is currently associated with the telephony system. In this regard, the first return message may indicate that the recipient extension is valid at the telephony system. In an embodiment using SCCP-based signaling, the first return message may be an SCCP dialtone message to indicate that the recipient extension is valid at the telephony system. In another embodiment using SIP-based signaling, the first return message may be an SCCP ACK message to indicate that the recipient extension is present at the telephony system and is therefore valid at the telephony system.

As another example, the voicemail system may alternatively receive a second return message from the telephony system in operation 110 if the recipient extension is not currently associated with the telephony system. In this regard, the second return message may indicate that the recipient extension is not present at the telephony system and is therefore invalid at the telephony system. In an embodiment using SCCP-based signaling, the second return message may be an SCCP dialtone denial message to indicate that the recipient extension is invalid at the telephony system. In another embodiment using SIP-based signaling, the second return message may be an SCCP NACK message to indicate that the recipient extension is invalid at the telephony system.

In an operation 112, the voicemail system determines whether the recipient extension is valid at the telephony system based on the return message received in operation 110.

In an operation 114, if the recipient extension is valid at the telephony system, then the voicemail system may document the validity of the recipient extension for the telephony system. In this regard, the voicemail system may perform operation 118 by updating a database or other appropriate data structure to reflect that the recipient extension is valid at the telephony system. For example, the voicemail system may update the database by documenting an association between the recipient extension and the telephony system. As a result, future MWI notifications, may be directed only to the telephony system, rather than all telephony systems that may be in communication with the voicemail system. In one embodiment, updating the database (i.e., operation 118) may be performed separately from operation 114. Otherwise, in another embodiment, updating the database may be performed as part of operation 114.

If the recipient extension is invalid at the telephony system, then, in one embodiment, the voicemail system may take no action in response thereto. Optionally, in another embodiment, the invalidity of the recipient extension at the telephony system may be documented in an operation 116, and the database may be updated to reflect the invalidity (operation 118). As similarly described above, in one embodiment, updating the database (operation 118) may be performed separately from operation 116. Otherwise, in another embodiment, updating the database may be performed as part of operation 116.

In various embodiments, operation 114 or optional operation 116 may comprise: documenting receipt of at least one of the first return message or the second return message, updating a memory component (e.g., a database) to indicate receipt of at least one of the first return message or the second return message, updating the memory component by associating the recipient extension to the telephony system if the extension is valid for the telephony system, updating the memory component to associate the recipient extension to the telephony system if the first return message is received, updating the memory component by not relating the recipient to the telephony system if the extension is invalid for the telephony system, and/or updating the memory component to not relate the recipient extension to the telephony system if the second return message is received.

Operations 104-118 may be repeated for any desired number of telephony systems to determine whether the recipient extension identified in operation 102 is present at any of the telephony systems. In addition, operations 102-118 may be repeated for a plurality of recipient extensions. As a result, the voicemail system performing method 100 may identify the validity of all recipient extensions at all telephony systems in communication with the voicemail system. Accordingly, following such operations, the voicemail system may direct future notifications (e.g., MWI notifications) for particular recipient extensions to only those telephony systems at which the recipient extensions are valid as indicated by the database.

For example, after the voicemail system documents an association between a recipient extension and a telephony system, the voicemail system may receive a voicemail message to be provided to a user of the recipient extension (operation 120). Accordingly, the voicemail system may subsequently send MWI notifications only to the particular telephony system with which the recipient extension is associated (operation 122). This can significantly reduce the number of MWI notifications sent by the voicemail system, thereby also reducing network traffic. In the event that a recipient extension moves from one telephony system (e.g., a first PBX system) to another telephony system (e.g., a second PBX system), the voicemail system may re-perform various operations of method 100 to re-determine which telephony system the recipient extension is associated with.

Figure 1B:
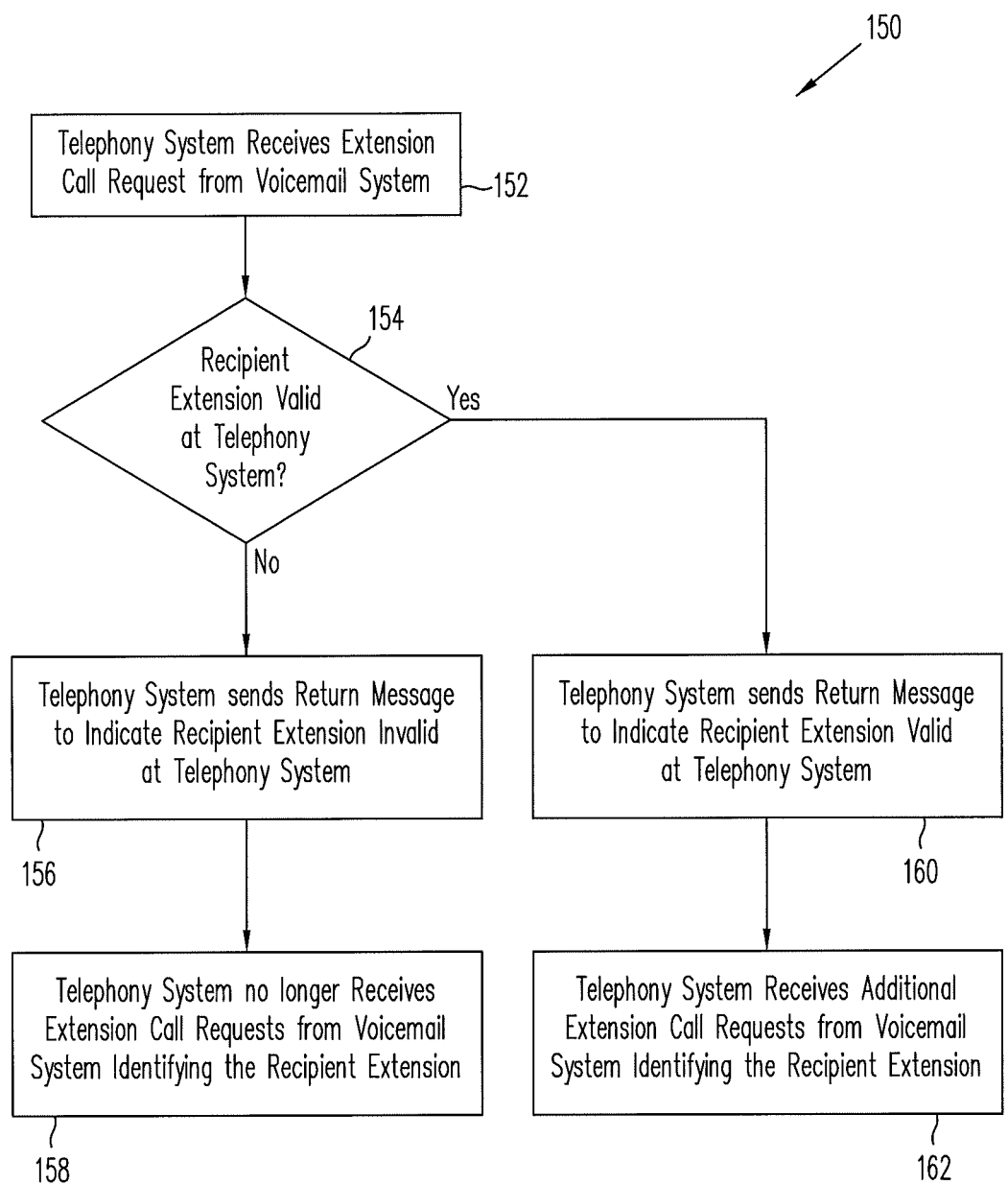
FIG. 1B shows an embodiment of a method performed by a telephony system in response to a voicemail system.

FIG. 1B shows an embodiment of a method 150 performed by a telephony system in response to a voicemail system. For example, method 150 may be performed by a PBX system as further described herein in response to various operations performed by a voicemail system in accordance with method 100 of FIG. 1A. However, any appropriate telephony system may be used. Similar to method 100, method 150 will be discussed with reference to SCCP-based signaling and SIP-based signaling for use with an IP voicemail system, such as Cisco Unity. However, method 150 may be similarly applied to various other protocols as may be desired in particular implementations.

Turning now to the particulars of method 150, in an operation 152, a telephony system receives a request from a voicemail system identifying a particular recipient extension. For example, operation 152 may be performed in response to operation 106 of method 100 of FIG. 1A previously described herein. In one embodiment using SCCP-based signaling, operation 152 may include the telephony system receiving an SCCP offhook message identifying the recipient extension. In another embodiment using SIP-based signaling, operation 152 may include the telephony system receiving an SIP MWI notify message identifying the recipient extension.

In an operation 154, the telephony system determines whether the particular recipient extension specified in the request received in operation 152 is valid at the telephony system. In this regard, the telephony system may maintain a database, table, list, or any other appropriate data structure as may be desired to locally determine whether a given recipient extension is valid at its location. Accordingly, in one embodiment, the telephony system may compare the particular recipient extension specified in the request with such data structures to determine the validity of the recipient extension. In another embodiment, the telephony system may attempt to contact the particular recipient extension to determine whether the recipient extension is valid.

If the telephony system determines in operation 154 that the specified recipient extension is invalid at its location, then the telephony system proceeds to perform an operation 156. In operation 156, the telephony system sends a return message to the voicemail system to indicate that the specified recipient extension is invalid. This return message may be received by the voicemail system as previously described with regard to operation 110 of FIG. 1A. In one embodiment using SCCP-based signaling, operation 156 may include the telephony system sending an SCCP dial tone denial message to the voicemail system. In response, the voicemail system may be forced to return to an onhook status in response to the SCCP dial tone denial message. In another embodiment using SIP-based signaling, operation 156 may include the telephony system sending an SIP NACK message to the voicemail system.

As previously described with regard to FIG. 1A, the voicemail system may document the recipient extension and update a database in response to the message returned by the telephony system in operation 156. Accordingly, the voicemail system may refrain from sending further requests (e.g., SCCP offhook messages or SIP MWI notify messages) specifying the recipient extension to the telephony system. As a result, the telephony system will no longer receive such messages from the voicemail system (operation 158).

If the telephony system determines in operation 154 that the specified recipient extension is valid at its location, then the telephony system proceeds to perform an operation 160. In operation 160, the telephony system sends a return message to the voicemail system to indicate that the specified recipient extension is valid. As similarly described above, this return message may be received by the voicemail system as previously described with regard to operation 110 of FIG. 1A. In one embodiment using SCCP-based signaling, operation 160 may include the telephony system sending an SCCP dial tone message to the voicemail system. In another embodiment using SIP-based signaling, operation 160 may include the telephony system sending an SIP ACK message to the voicemail system.

As also similarly described above, the voicemail system may document the recipient extension and update a database in response to the message returned by the telephony system in operation 160. Accordingly, because the voicemail system now associates the recipient extension with the telephony system, the voicemail system may send further requests (e.g., SCCP offhook messages or SIP MWI notify messages) specifying the recipient extension to the telephony system. As a result, the telephony system may receive such messages from the voicemail system (operation 162).

Figure 2:
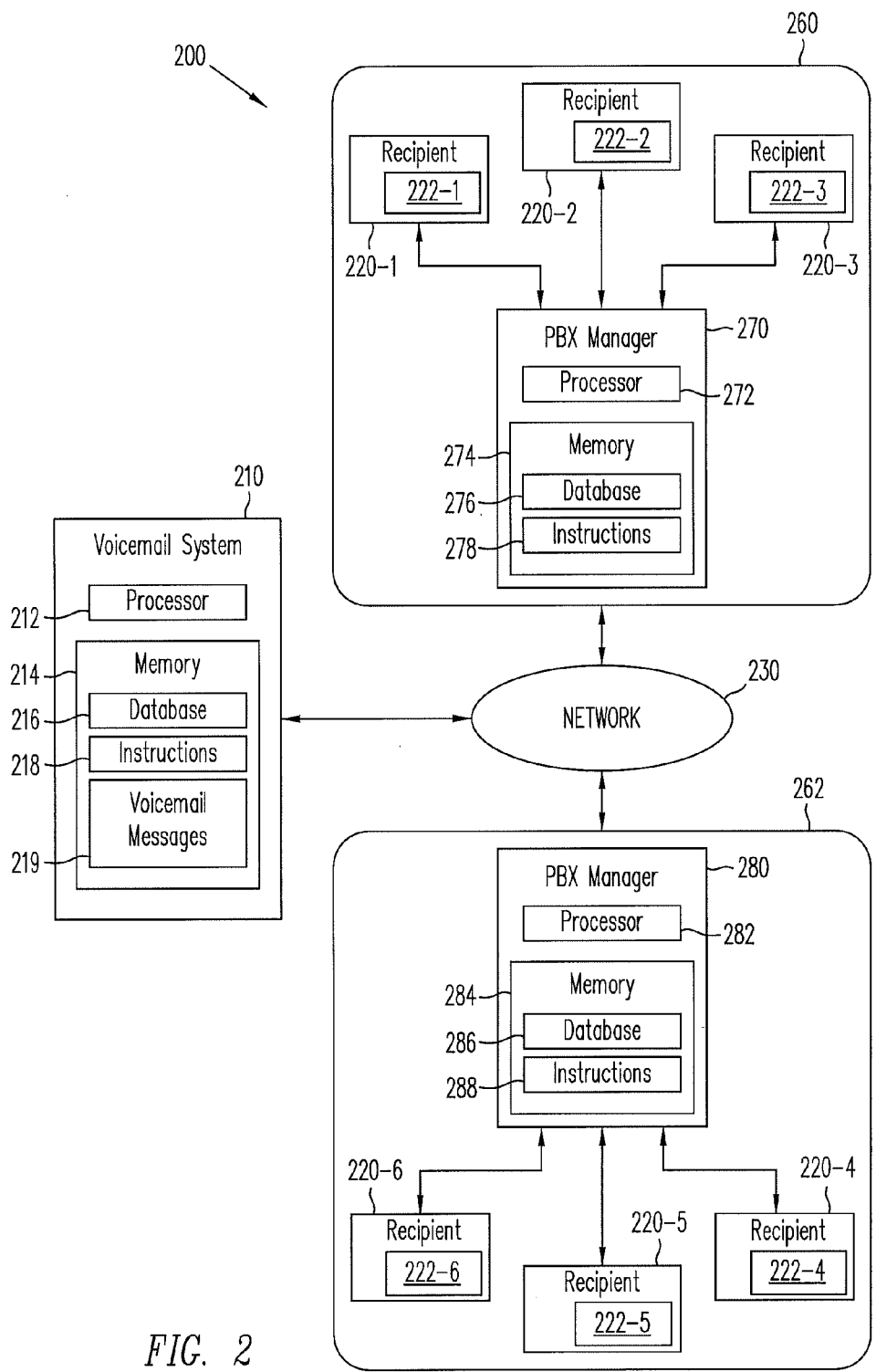
FIG. 2 shows an embodiment of a networked system including a voicemail system and a plurality of telephony systems.

FIG. 2 shows a block diagram of an embodiment of a networked system 200 suitable for implementing the operations described in FIGS. 1A and 1B. Networked system 200 includes a voicemail system 210 and a plurality of telephony systems implemented as PBX systems 260 and 262 in communication over a network 230 (e.g., the Internet, Intranet, etc.). In this regard, it will be appreciated that voicemail system 210 may be implemented to perform method 100 of FIG. 1A, and one or more of PBX systems 260 and 262 may be implemented to perform method 150 of FIG. 1B. In one embodiment, networked system 200 may be implemented as a VoIP system. In this regard, the various components of networked system 200 may be implemented to facilitate voice-based telephony over IP-based communications.

As illustrated, a first group of recipients 220-1 to 220-3 (e.g., end users, callers, etc.) may be grouped together in PBX system 260, and a second group of recipients 220-4 to 220-6 may be grouped together in PBX system 262. For illustrative purposes, six recipients 220-1 to 220-6 (e.g., end users) and two PBX systems 260 and 262 are shown in FIG. 2. However, networked system 200 may include any number of recipients or PBX systems with any type of grouping of recipients in the PBX systems.

PBX systems 260 and 262 also include PBX managers 270 and 280 (e.g., PBX servers, controllers, or other appropriate components), respectively. In this regard, PBX managers 270/280 may be implemented with one or more processors 272/282 for executing instructions 278/288 stored by one or more memories 274/284 coupled to processors 272/282 to perform method 150 of FIG. 1B. As shown, memories 274/284 may also store appropriate data structures (e.g., databases 276/286 or other data structures such as tables, lists, or any other appropriate data structures) that may be used by PBX managers 270/280 in operation 154 previously described herein to locally determine which recipient extensions are currently valid at PBX systems 260/262 of PBX managers 270/280. Processors 272/282 may be implemented as microprocessors, single-core processors, multi-core processors, microcontrollers, digital signal processing (DSP) devices, or other appropriate processor types to perform method 150 of FIG. 1B. In one example, as shown in FIG. 2, PBX manager 270 is adapted to manage communication between voicemail system 210 and recipients 220-1 to 220-3, and PBX manager 280 is adapted to manage communication between voicemail system 210 and recipients 220-4 to 220-6.

As shown, each of recipients 220-1 to 220-6 may be associated with a corresponding recipient extension 222-1 to 222-6, respectively, which may be used by PBX manager 270 or 280 to direct communications (e.g., telephone calls or MWI notifications) to particular recipients 220-1 to 220-6. The particular PBX system 260 or 262 on which a given recipient extension resides may be determined by voicemail system 210 in various ways as previously described herein.

Voicemail system 210 may be implemented with one or more processors 212 for executing instructions 218 stored by one or more memories 214 coupled to processor 212 to perform method 100 of FIG. 1A. As shown, memory 214 may also store appropriate data structures (e.g., database 216 or other data structures such as tables, lists, or any other appropriate data structures) that may be used by voicemail system 210 to document associations between various recipient extensions and telephony systems as previously described herein. Memory 214 may also store voicemail messages 219 associated with particular recipient extensions. Processor 212 may be implemented as a microprocessor, single-core processor, multi-core processor, microcontroller, digital signal processing (DSP) device, or other appropriate processor type to perform method 100 of FIG. 1A. In one embodiment, each recipient 220-1 to 220-6 may be associated with an identification number, such as a call or phone number, stored in database 216 of voicemail system 210.

In one embodiment, voicemail system 210 may be configured to receive and transmit alerts, indications, etc. to inform recipients 220-1 to 220-6 of incoming calls and/or voicemail messages. Recipients 220-1 to 220-6 are adapted to receive call and voicemail alerts using any applicable means, including, but not limited to wireless communication and conventional phone systems. It should be appreciated that alerts may be in any applicable format, such as actual voice calls, voice messages, video message, text messages, etc. PBX systems 260 and 262 and voicemail system 210 may communicate as discussed with regard to FIGS. 1A and 1B to enable voicemail system 210 to discover which recipient extensions are present at each PBX system 260 and 262. Voicemail system 210 may also be configured to effectuate the communications. For example, for transmitting and receiving signals to and from various locations, voicemail system 210 may utilize ports with corresponding connectors, such as phone, fiber, or communication lines or antennas for wireless transmission and reception. Suitable circuitry, such as various signal processing elements may be utilized to process the signals for analysis by processor 212. Processor 212 may be configured to analyze the signals according to the various operations described herein. Processors 272 and 282 and PBX managers 270 and 280 may be similarly configured with suitable circuitry or otherwise to analyze appropriate signals according to the various operations described herein. Any conventional transmitting, receiving, and processing means may be used to implement the operations as discussed herein. Accordingly, voicemail system 210 may be implemented to send out MWI notifications to particular locations when desired.

It should be appreciated that FIG. 2 represents one embodiment of networked system 200. Accordingly, other systems including any number of recipients in any number of PBX systems with any number of PBX managers and recipient extensions may be used without departing from the scope of the present disclosure.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various operations described herein may be changed, combined into composite operations, and/or separated into sub-operations to provide features described herein.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
submitting an extension call request to a telephony system, wherein the extension call request identifies a recipient extension;
receiving a return message from the telephony system in response to the extension call request;
determining whether the recipient extension is currently associated with the telephony system based on the return message received from the telephony system;
documenting an association between the recipient extension and the telephony system if the recipient extension is currently associated with the telephony system;
wherein the extension call request comprises a Skinny Client Control Protocol (SCCP) offhook message identifying the recipient extension;
wherein the return message received from the telephony system comprises an SCCP dialtone message if the recipient extension is currently associated with the telephony system; and
wherein the return message received from the telephony system comprises an SCCP dialtone denial message if the recipient extension is not currently associated with the telephony system.

2. The method of claim 1, further comprising repeating the method for a plurality of telephony systems to determine which of the telephony systems the recipient extension is currently associated with.

3. The method of claim 2, further comprising repeating the method to re-determine which of the telephony systems the recipient extension is currently associated with.

4. The method of claim 1, further comprising repeating the method for a plurality of recipient extensions to determine which of the recipient extensions are associated with the telephony system.

5. The method of claim 1, wherein the documenting comprises updating a database identifying the recipient extension and the telephony system.

6. A method comprising:
submitting an extension call request to a telephony system, wherein the extension call request identifies a recipient extension;
receiving a return message from the telephony system in response to the extension call request;
determining whether the recipient extension is currently associated with the telephony system based on the return message received from the telephony system;
documenting an association between the recipient extension and the telephony system if the recipient extension is currently associated with the telephony system;
wherein the extension call request comprises a Session Initiation Protocol (SIP) message waiting indicator (MWI) notify message identifying the recipient extension;
wherein the return message received from the telephony system comprises an SIP ACK message if the recipient extension is currently associated with the telephony system; and
wherein the return message received from the telephony system comprises an SIP NACK message if the recipient extension is not currently associated with the telephony system.

7. The method of claim 1, wherein the method is performed by a voicemail system, the method further comprising:
receiving a voicemail message; and
sending a message waiting indicator (MWI) notification to the telephony system based on the association between the recipient extension and the telephony system.

8. A voicemail system comprising:
one or more processors; and
a memory coupled to the one or more of the processors comprising instructions executable by one or more of the processors, the one or more of the processors operable when executing the instructions to:
submit an extension call request to a telephony system, wherein the extension call request identifies a recipient extension,
receive a return message from the telephony system in response to the extension call request,
determine whether the recipient extension is currently associated with the telephony system based on the return message received from the telephony system,
document an association between the recipient extension and the telephony system if the recipient extension is currently associated with the telephony system, wherein the extension call request comprises a Skinny Client Control Protocol (SCCP) offhook message identifying the recipient extension, wherein the return message received from the telephony system comprises an SCCP dialtone message if the recipient extension is currently associated with the telephony system, and wherein the return message received from the telephony system comprises an SCCP dialtone denial message if the recipient extension is not currently associated with the telephony system.

9. The voicemail system of claim 8, wherein the one or more of the processors executing the instructions are further operable to:

submit additional extension call requests identifying the recipient extension to additional telephony systems;

receive additional return messages from the additional telephony systems in response to the additional extension call requests;

determine whether the recipient extension is currently associated with the additional telephony systems based on the additional return messages received from the additional telephony systems; and document associations between the recipient extension and the additional telephony systems if the recipient extension is currently associated with the additional telephony systems.

10. The voicemail system of claim 9, wherein the one or more of the processors executing the instructions are further operable to:

re-determine whether the recipient extension is currently associated with the additional telephony systems.

11. The voicemail system of claim 8, wherein the one or more of the processors executing the instructions are further operable to:

submit additional extension call requests to the telephony system, wherein the additional extension call requests identify additional recipient extensions;

receive additional return messages from the telephony system in response to the additional extension call requests;

determine whether the additional recipient extensions are currently associated with the telephony system based on the additional return messages received from the telephony system; and document associations between the additional recipient extensions and the telephony system if the additional recipient extensions are currently associated with the telephony system.

12. The voicemail system of claim 8, wherein the one or more of the processors executing the instructions are further operable to update a database identifying the recipient extension and the telephony system if the recipient extension is currently associated with the telephony system.

13. A voicemail system comprising:

one or more processors; and a memory coupled to the one or more of the processors comprising instructions executable by one or more of the processors, the one or more of the processors operable when executing the instructions to:

submit an extension call request to a telephony system, wherein the extension call request identifies a recipient extension, receive a return message from the telephony system in response to the extension call request, determine whether the recipient extension is currently associated with the telephony system based on the return message received from the telephony system, document an association between the recipient extension and the telephony system if the recipient extension is currently associated with the telephony system, wherein the extension call request comprises a Session Initiation Protocol (SIP) message waiting indicator (MWI) notify message identifying the recipient extension, wherein the return message received from the telephony system comprises an SIP ACK message if the recipient extension is currently associated with the telephony system, and wherein the return message received from the telephony system comprises an SIP NACK message if the recipient extension is not currently associated with the telephony system.

14. The voicemail system of claim 8, wherein the one or more of the processors executing the instructions are further operable to:

receive a voicemail message; and send a message waiting indicator (MWI) notification to the telephony system based on the association between the recipient extension and the telephony system.

15. A method comprising:

receiving an extension call request at a telephony system from a voicemail system, wherein the extension call request identifies a recipient extension;

determining whether the recipient extension is currently associated with the telephony system;

sending a return message to the voicemail system to indicate whether the recipient extension is currently associated with the telephony system;

receiving a message waiting indicator (MWI) notification at the telephony system from the voicemail system based on a documented association between the recipient extension and the telephony system stored by the voicemail system in response to the return message;

wherein the extension call request comprises a Skinny Client Control Protocol (SCCP) offhook message identifying the recipient extension;

wherein the return message comprises an SCCP dialtone message if the recipient extension is currently associated with the telephony system; and wherein the return message comprises an SCCP dialtone denial message if the recipient extension is not currently associated with the telephony system.

16. The method of claim 15, further comprising repeating the method for a plurality of recipient extensions.

17. A method comprising:

receiving an extension call request at a telephony system from a voicemail system, wherein the extension call request identifies a recipient extension;

determining whether the recipient extension is currently associated with the telephony system;

sending a return message to the voicemail system to indicate whether the recipient extension is currently associated with the telephony system;

receiving a message waiting indicator (MWI) notification at the telephony system from the voicemail system based on a documented association between the recipient extension and the telephony system stored by the voicemail system in response to the return message;

wherein the extension call request comprises a Session Initiation Protocol (SIP) message waiting indicator (MWI) notify message identifying the recipient extension;

wherein the return message comprises an SIP ACK message if the recipient extension is currently associated with the telephony system; and wherein the return message comprises an SIP NACK message if the recipient extension is not currently associated with the telephony system.

18. A telephony system comprising:

one or more processors; and a memory coupled to the one or more of the processors comprising instructions executable by one or more of the processors, the one or more of the processors operable when executing the instructions to:

receive an extension call request at the telephony system from a voicemail system, wherein the extension call request identifies a recipient extension, determine whether the recipient extension is currently associated with the telephony system, send a return message to the voicemail system to indicate whether the recipient extension is currently associated with the telephony system, receive a message waiting indicator (MWI) notification at the telephony system from the voicemail system based on a documented association between the recipient extension and the telephony system stored by the voicemail system in response to the return message, wherein the extension call request comprises a Skinny Client Control Protocol (SCCP) offhook message identifying the recipient extension, wherein the return message comprises an SCCP dialtone message if the recipient extension is currently associated with the telephony system, and wherein the return message comprises an SCCP dialtone denial message if the recipient extension is not currently associated with the telephony system.

19. The telephony system of claim 18, wherein the one or more of the processors executing the instructions are further operable to:

receive additional extension call requests at the telephony system from the voicemail system, wherein the additional extension call requests identify additional recipient extensions;

determine whether the additional recipient extensions are currently associated with the telephony system; and send additional return messages to the voicemail system to indicate whether the additional recipient extensions are currently associated with the telephony system.

20. A telephony system comprising:

one or more processors; and a memory coupled to the one or more of the processors comprising instructions executable by one or more of the processors, the one or more of the processors operable when executing the instructions to:

receive an extension call request at the telephony system from a voicemail system, wherein the extension call request identifies a recipient extension, determine whether the recipient extension is currently associated with the telephony system, send a return message to the voicemail system to indicate whether the recipient extension is currently associated with the telephony system, and receive a message waiting indicator (MWI) notification at the telephony system from the voicemail system based on a documented association between the recipient extension and the telephony system stored by the voicemail system in response to the return message, wherein the extension call request comprises a Session Initiation Protocol (SIP) message waiting indicator (MWI) notify message identifying the recipient extension, wherein the return message comprises an SIP ACK message if the recipient extension is currently associated with the telephony system, and wherein the return message comprises an SIP NACK message if the recipient extension is not currently associated with the telephony system.

\* \* \* \* \*